United States Patent [19]
Braxton et al.

[11] Patent Number: 4,639,654
[45] Date of Patent: Jan. 27, 1987

[54] EMERGENCY GENERATOR BATTERY SYSTEM

[76] Inventors: Benjamin D. Braxton; George Spector, both of 233 Broadway, Rm 3615, both of New York, N.Y. 10007

[21] Appl. No.: 751,504

[22] Filed: Jul. 2, 1985

[51] Int. Cl.$^4$ .............................................. H02J 7/00
[52] U.S. Cl. ...................................... 320/2; 339/29 B
[58] Field of Search ........................... 322/1; 320/2–5, 320/61, 15, 16, 21; 290/1 R, 1 E, 1 C; 339/29 B, 5 RL, 15; 191/12.2 R; 310/69, 75 B; 128/783; 242/96, 107.6

[56] References Cited

U.S. PATENT DOCUMENTS

| | | | |
|---|---|---|---|
| 2,336,426 | 12/1943 | Trotta | 128/783 |
| 2,626,972 | 1/1953 | Marquardt | 320/2 X |
| 3,510,745 | 5/1970 | Futterer | 320/7 |
| 3,594,627 | 7/1971 | Lesher | 320/21 |
| 3,694,729 | 9/1972 | Jones | 320/16 X |
| 4,050,003 | 9/1977 | Owings | 320/2 |
| 4,161,682 | 7/1979 | Corvette | 339/29 B |
| 4,215,306 | 7/1980 | Mace | 320/2 |
| 4,489,223 | 12/1984 | Puckett et al. | 320/2 X |

*Primary Examiner*—R. J. Hickey

[57] ABSTRACT

An emergency generator for a battery is provided and consists of a housing with a handle so that a person can grip the handle to hold the housing, a power source mounted within the housing and a pair of terminal rings electrically connected to the power source. The rings can be placed onto the terminals of the battery so that the person can activate the power source to charge the battery used for starting an engine of a motor vehicle.

2 Claims, 6 Drawing Figures

U.S. Patent  Jan. 27, 1987  4,639,654
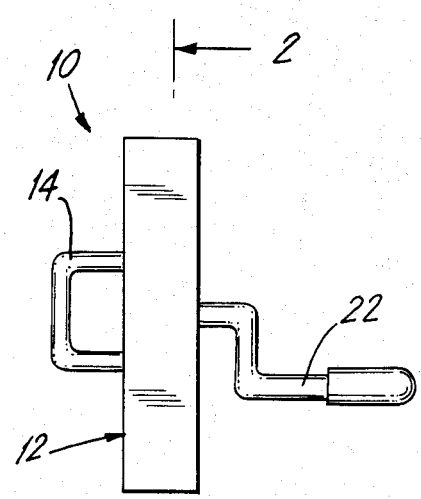
FIG. 1
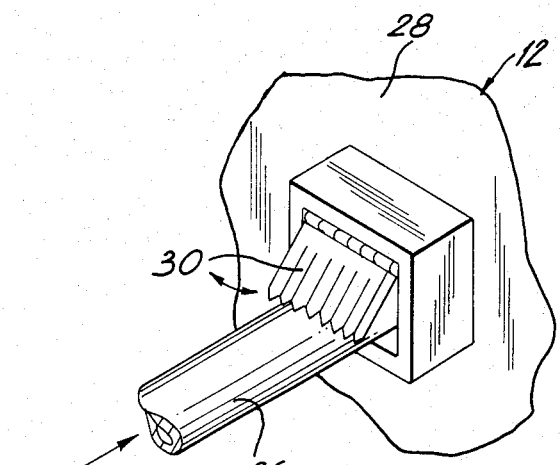
FIG. 4
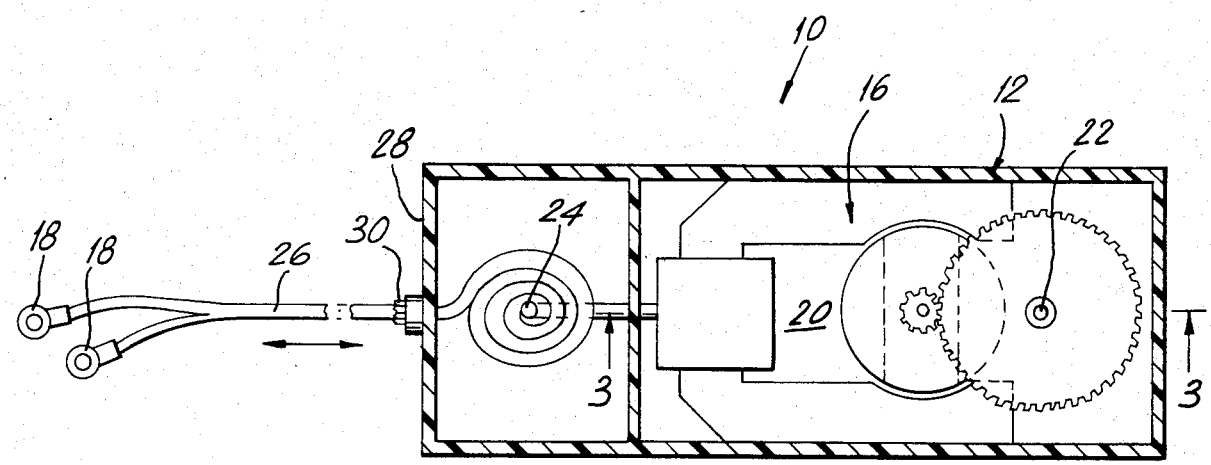
FIG. 2
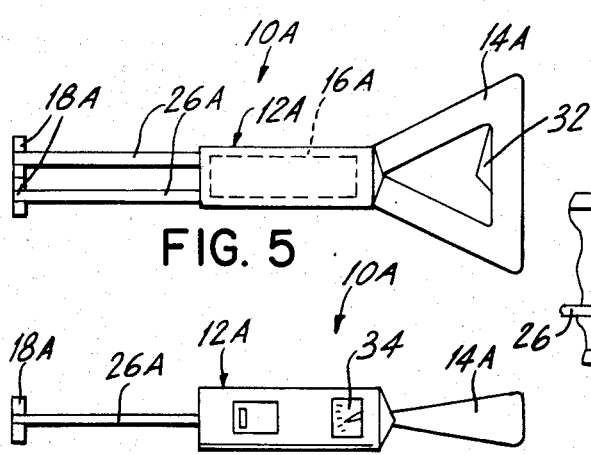
FIG. 5
FIG. 6
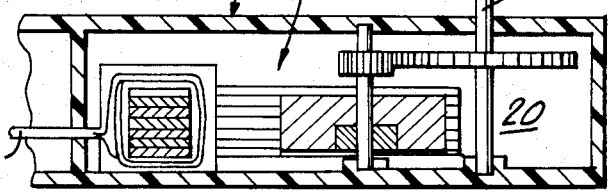
FIG. 3

EMERGENCY GENERATOR BATTERY SYSTEM

BACKGROUND OF THE INVENTION

The instant invention relates generally to generators and more specifically it relates to an emergency generator for a battery.

Numerous generators have been provided in prior art that are adapted for use in generating electrical current for various purposes. For example, U.S. Pat. Nos. 1,356,778; 2,393,813 and 2,720,601 all are illustrative of such prior art. While these units may be suitable for the particular purpose to which they address, they would not be as suitable for the purposes of the present invention as heretofore described.

SUMMARY OF THE INVENTION

A principle object of the present invention is to provide an emergency generator for a battery that will quickly change the partially dead or cold battery when an engine in a motor vehicle will not start.

Another object is to provide an emergency generator for a battery that is a magnetic type having a crank arm that is directly electrically connected to the battery to produce current to recharge it.

An additional object is to provide an emergency generator for a battery that has a switch to charge a six volt motorcycle battery or a twelve volt automobile battery and contains an energy gauge to display current level being consumed from a built in handle trigger activated power source.

A further object is to provide an emergency generator for a battery that is economical in cost to manufacture.

A still further object is to provide an emergency generator for a battery that is simple and easy to use.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is an end view of a first form of the invention.

FIG. 2 is a cross sectional view taken along line 2—2 in FIG. 1.

FIG. 3 is a cross sectional view taken along line 3—3 in FIG. 2 showing the generators internal construction.

FIG. 4 is an enlarged perspective view of a portion of the housing showing the stop latch mechanism.

FIG. 5 is a side view of a second form of the invention.

FIG. 6 is a top view thereof.

DETAILED DESCRIPTION OF THE PREFERRED EMBODIMENTS

Turning now descriptively to the drawings, in which similar reference characters denote similar elements throughout the several views, FIGS. 1 through 3 illustrates an emergency generator 10 for a battery (not shown). The generator consists of a housing 12 with a handle 14 so that a person (not shown) can grip the handle 14 to hold the housing 12.

A power source 16 is mounted within the housing 12. A pair of terminal rings 18, 18 are electrically connected to the power source 16. The terminal rings 18, 18 can be placed onto the terminals of the battery so that the person can activate the power source 16 to charge the battery used for starting an engine of a motor vehicle.

The power source 16 is a magneto type generator 20 that has a crank arm 22 to mechanically generate electrical current. Since the magneto type generator 20 is well known in the art details of its structure is not needed to be described herein.

A spring biased reel 24 is mounted within the housing 12. An elongated wire cable 26 is wrapped around the reel 24 to extend outwardly through side 28 of the housing 12 and is electrically connected between the magneto type generator 20 and the terminal rings 18, 18.

A spring lock latch 30 (see FIG. 4) is mounted to the side 28 of the housing 12 to engage with the wire cable 26. The cable can be pulled out and locked by the latch 30 to any desirable length as needed.

FIGS. 5 and 6 show another type of emergency generator 10A which includes a pair of wire cables 26A. Each cable 26A is electrically connected between the power source 16A and each terminal ring 18A. A trigger 32 is mounted within the handle 14A of the housing 12A to activate the power source 20A.

An energy gauge 34 is mounted on the housing 12A to display current level being consumed from the power source 20A. A switch 36 is also mounted on the housing 12A. When the switch 36 is in one position the power source 20A will charge a six volt motorcycle battery. When the switch 36 is in another position the power source 20A will charge a twelve volt automobile battery.

The power source 20A as shown in FIG. 5 can be microelectric oscillators, power multipliers, energy storage circuits or microelectric circuits.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An emergency generator for a battery which comprises:
   (a) a housing with a handle;
   (b) a magneto power source mounted within said housing;
   (c) electric leads on a reel within said housing; and
   (d) a pair of terminal rings mounted on end portions of said leads which extend externally from said housing and a crank for actuating said magneto mounted on said housing, said crank being rotatable about an axis parallel to the axis of rotation of said reel, wherein said reel is spring biased to the reeled-in position and said leads are in the form of a cable that extends outwardly through a side of said housing in a direction transverse to said crank axis; including a spring lock latch mounted on said side of said housing to engage with said cable so that said cable can be pulled out and locked by said latch to any desireable length as needed.

2. A generator as in claim 1, wherein said crank operates a gear system which rotates the magneto rotor wherein the housing is elongated to accomodate the gear system, the magneto, the reel and the cable arranged longitudinally within the housing and wherein cable extends externally in such longitudinal alignment, said housing having spaced longitudinal sides upon which the crank and handle are oppositely mounted.

* * * * *